(12) United States Patent
Lee et al.

(10) Patent No.: US 9,456,369 B2
(45) Date of Patent: Sep. 27, 2016

(54) MANAGEMENT OF MODULATION AND CODING SCHEME IMPLEMENTATION

(75) Inventors: Jung Gun Lee, Mountain View, CA (US); Sung-Ju Lee, Redwood City, CA (US); Sungro Yoon, Raleigh, NC (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 14/391,838

(22) PCT Filed: Jul. 31, 2012

(86) PCT No.: PCT/US2012/049025
§ 371 (c)(1),
(2), (4) Date: Oct. 10, 2014

(87) PCT Pub. No.: WO2014/021859
PCT Pub. Date: Feb. 6, 2014

(65) Prior Publication Data
US 2015/0139002 A1    May 21, 2015

(51) Int. Cl.
H04W 24/08 (2009.01)
H04L 25/02 (2006.01)
H04L 1/00 (2006.01)
H04L 1/20 (2006.01)

(52) U.S. Cl.
CPC ............ *H04W 24/08* (2013.01); *H04L 1/0003* (2013.01); *H04L 1/0009* (2013.01); *H04L 1/0019* (2013.01); *H04L 1/0027* (2013.01); *H04L 25/0222* (2013.01); *H04L 1/203* (2013.01)

(58) Field of Classification Search
CPC . H04W 24/08; H04W 52/26; H04W 52/262; H04W 52/265; H04W 28/0268
USPC ................................. 370/310–350, 464–465
See application file for complete search history.

(56) References Cited

U.S. PATENT DOCUMENTS

| 6,473,467 B1 * | 10/2002 | Wallace | H04B 7/0417 370/208 |
| 7,333,556 B2 | 2/2008 | Maltsev et al. | |
| 7,688,766 B2 * | 3/2010 | Maltsev | H04L 5/006 370/310 |

(Continued)

FOREIGN PATENT DOCUMENTS

| EP | 2056509 | 5/2009 |
| EP | 2234361 A1 | 9/2010 |

OTHER PUBLICATIONS

Aditya Gudipati, et al. "Strider: Automatic Rate Adaptation and Collision Handling", ACM SIGCOMM Aug. 15-19, 2011, Toronto, Ontario, Canada.

(Continued)

*Primary Examiner* — Warner Wong

(57) ABSTRACT

In an example, packets transmitted over a communication channel from a transmitter are received. Channel state information (CSI) from the received packets are obtained and signal-to-noise (SNR) values of the communication channel are computed based on the obtained CSI. In addition, effective bit error rate (BER) values are determined based on the SNR values, a coherence time period within which the effective BER values of the communication channel remain within a predetermined range is determined, a modulation and coding scheme (MCS) to be implemented by the transmitter is determined based on the effective BER values within the coherence time period, and the determined MCS is transmitted to the transmitter.

15 Claims, 7 Drawing Sheets

WLAN
100

(56) References Cited

U.S. PATENT DOCUMENTS

| | | | |
|---|---|---|---|
| 7,778,340 B2 | 8/2010 | Zhengang et al. | |
| 8,175,181 B1* | 5/2012 | Nabar | H04L 1/0003 370/437 |
| 8,462,869 B2 | 6/2013 | Okino | |
| 8,649,456 B2* | 2/2014 | Xia | H04B 7/0626 370/208 |
| 8,913,533 B2* | 12/2014 | Maltsev | H04L 5/0046 370/310 |
| 2003/0095506 A1* | 5/2003 | Jalali | H04L 1/0002 370/252 |
| 2004/0264588 A1* | 12/2004 | Song | H04L 1/0003 375/260 |
| 2007/0099577 A1* | 5/2007 | Lee | H04L 1/0026 455/69 |
| 2008/0130790 A1* | 6/2008 | Forenza | H04B 7/0452 375/299 |
| 2009/0052512 A1 | 2/2009 | Kim et al. | |
| 2009/0067528 A1* | 3/2009 | Loh | H04L 1/0015 375/267 |
| 2009/0116544 A1* | 5/2009 | Zhang | H04L 1/0003 375/227 |
| 2009/0116589 A1* | 5/2009 | Zhang | H04L 1/0003 375/341 |
| 2009/0290541 A1* | 11/2009 | Nishio | H04L 1/0004 370/328 |
| 2009/0303944 A1* | 12/2009 | Fukuoka | H04L 5/0037 370/329 |
| 2009/0323641 A1* | 12/2009 | Futagi | H04L 1/0003 370/335 |
| 2010/0061359 A1* | 3/2010 | Fukuoka | H04J 11/0026 370/342 |
| 2010/0061438 A1* | 3/2010 | Tan | H04L 1/0003 375/227 |
| 2010/0208839 A1 | 8/2010 | Walton et al. | |
| 2010/0278225 A1* | 11/2010 | Chun | H04L 5/0007 375/224 |
| 2010/0329134 A1* | 12/2010 | Doppler | H04L 1/0029 370/252 |
| 2011/0129028 A1* | 6/2011 | Lee | H04L 25/03171 375/262 |
| 2011/0149836 A1* | 6/2011 | Hong | H04B 7/18543 370/316 |
| 2011/0158219 A1* | 6/2011 | Ko | H04B 7/0413 370/344 |
| 2011/0310994 A1* | 12/2011 | Ko | H04B 7/0639 375/295 |
| 2012/0182899 A1* | 7/2012 | Mujtaba | H04B 7/0417 370/252 |
| 2013/0272211 A1* | 10/2013 | Quan | H04B 7/0452 370/329 |
| 2013/0303171 A1* | 11/2013 | Jang | H04W 36/30 455/436 |
| 2013/0308509 A1* | 11/2013 | Ji | H04W 88/02 370/311 |
| 2013/0315153 A1* | 11/2013 | Sebeni | H04L 1/0001 370/329 |

OTHER PUBLICATIONS

Cho, Y. et al, "A Multi-tier Model for BER Prediction Over Wireless Residual Channels", Mar. 14-16, 2007.

Hakyling Jung, et al., "REACT:REACT: Rate Adaptation using Coherence Time in 802,11 WLANs", Elsevier Computer Communications, vol. 34, No. 11, Jul. 2011.

Halperin, Daniel, et al., Predictable 802,11 Packet Delivery from Wireless Channel Measurements, University of Washington and Intel Labs Seattle, 2010.

Kumar G, et al, "Joint Chunk, Power and Bit Allocation in Multicast OFDMA System with Average BER Constraint", Dec. 6-8, 2012.

Loannis Pefkianakis, et al. "MIMO Rate Adaptation in 802.11n Wireless Networks,"; Mobicom 2010; 12 pages.

Tao, Tao, et al., Performance Analysis of Link Adaptation in LTE Systems, University of Duisburg-Essen, Duisburg, Germany, Feb. 24-25, 2011.

* cited by examiner

MANAGEMENT OF MODULATION AND CODING SCHEME IMPLEMENTATION

BACKGROUND

The deployment of wireless local area networks (WLANs) has recently experienced explosive growth as multiple applications and services now demand high throughput networks. A WLAN, such as an IEEE 802.1n system, includes modulation and coding schemes (MCSs) for a transmitter to employ to transmit data to receivers in the network. To transmit the data to a receiver, the transmitter selects one of the MCSs to modulate, encode, and transmit the data over one of the communication channels in the network. Typically, the selection of the MCS is made through a probing process in which communication of data is iteratively attempted at different bit rates until a working bit rate is found. The iterative search of the MCS, which is the current scheme deployed in most WLAN devices, has been found to be time-consuming and unable to adapt to fast varying channels since there may be a relatively large number of different bit rates that may be attempted before the working bit rate is found.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
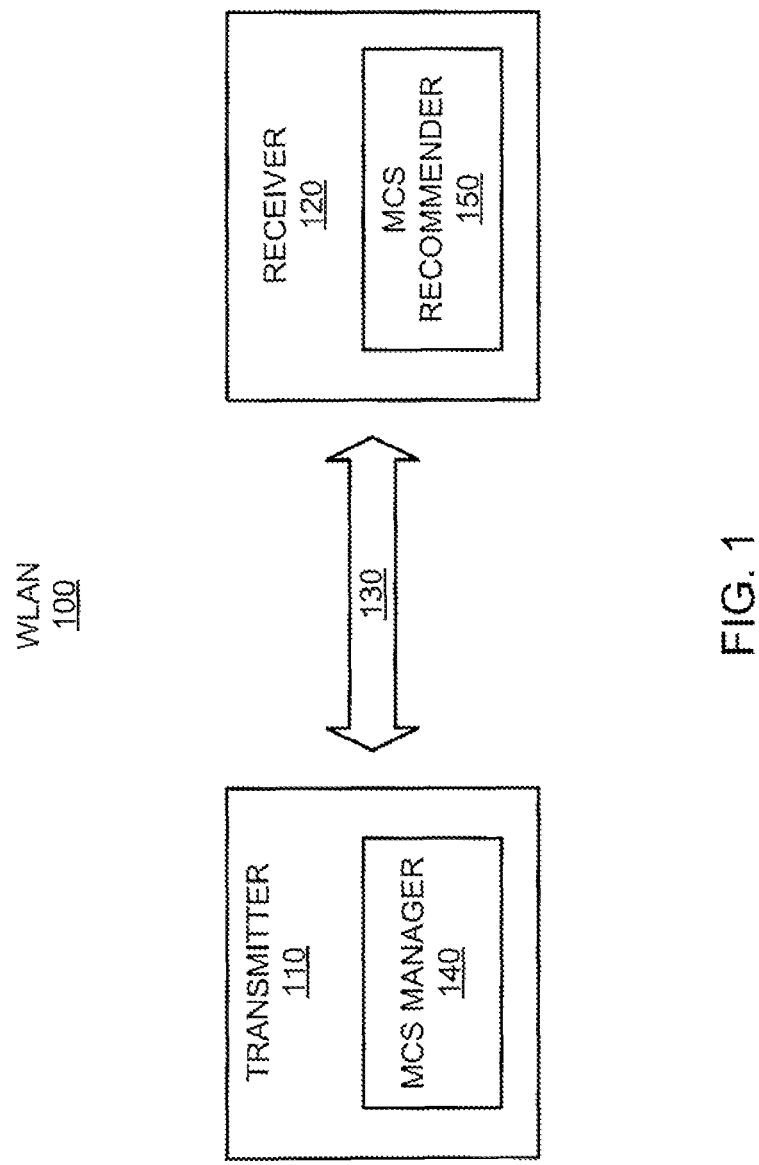
FIG. 1 shows a block diagram of a WLAN, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

Disclosed herein is a method in which a receiver recommends a modulation and coding scheme (MCS) to be implemented by a transmitter in transmitting data packets to the receiver. In the method, packets transmitted over a communication channel from the transmitter are received by the receiver. In addition, channel state information (CSI) of the communication channel is obtained from the received packets, in which the CSI indicates conditions of the communication channel. Moreover, signal-to-noise ratio (SNR) values of the communication channel are computed based on the obtained CSI, and a plurality of effective bit-error rate (BER) values are determined based on the SNR values. A coherence time period is determined, wherein the coherence time period is a time duration within which the effective BER values of the communication channel remain within a predetermined range. A modulation and coding scheme (MCS) to be implemented by the transmitter is determined based on the effective BER values within the coherence time period, and the determined MCS is transmitted as a recommended MCS to the transmitter. Also disclosed herein is a receiver that implements the method.

Further disclosed herein is a method in which a transmitter manages implementation of the recommended MCSs. In the method, a message including a MCS as a recommended MCS to implement in communicating packets to the receiver over a communication channel and a coherence time period to send the packets are received from a receiver, in which the coherence time period is a time duration within which SNR values of the communication channel remain within a predetermined range. In addition, a determination as to whether the coherence time period has expired, and if the coherence time period has expired, a request is transmitted to the receiver to request another MCS and another coherence time period.

Through implementation of the methods and apparatuses disclosed herein, the selection of the MCS to be implemented by transmitters in a wireless local area network may be made in a relatively fast manner. In one regard, the methods and apparatuses disclosed herein substantially maximize the selection of the MCS to be implemented by the transmitters. By way of particular example, the methods and apparatus disclosed herein maximize the link throughput of multiple input, multiple output orthogonal frequency-division multiplexing (MIMO-OFDM) systems.

With reference to FIG. 1, there is shown a block diagram of a wireless local area network (WLAN) 100, according to an example of the present disclosure. The WLAN 100 is depicted as including a transmitter 110 and a receiver 120. The transmitter 110 transmits data packets to the receiver 120 via a wireless communication channel 130. According to an example, the transmitter 110 may comprise an access point, such as a wireless router that operates under any IEEE 802.11x standard, and the receiver 120 may comprise a communication device, such as a client computer device, server, printer, copier, etc., for receiving data packets from the access point. According to another example, the transmitter 110 of FIG. 1 may comprise the communication device and the receiver 120 may comprise the access point of the WLAN for receiving data packets from the communication device. According to yet another example, the transmitter 110 may comprise a first access point and the receiver 120 may comprise a second access point in a bridge or mesh network. It should be understood that the WLAN 100 of FIG. 1 may include additional components, and that the components described herein may be removed and/or modified without departing from a scope of the WLAN 100. For instance, although the WLAN 100 is depicted in FIG. 1 as including two devices, i.e., transmitter 110 and receiver 120, it should be understood that the WLAN 100 may include more than two devices.

In FIG. 1, the transmitter 110 is depicted as including a MCS manager 140 for managing the MCSs implemented by the transmitter 110 in transmitting data packets to destination devices, such as the receiver 120. According to an example, the access point 110 receives recommendations of MCSs from the receiver 120. When the transmitter 110 is ready to transmit data packets to the receiver 120, the MCS manager 140 of the transmitter 110 selects a MCS recommended by that receiver 120 to modulate and encode the data packets for transmission to receiver 120.

As will be discussed in further detail below, with each recommended MCS received from the receiver 120, the transmitter 110 also receives a coherence time period, which is a recommended time period for utilizing the recommended MCS. The coherence time period is a time duration within which the quality of the communication channel, based on the signal-to-noise ratio thereof, does not change more than a predetermined amount. The MCS manager 140 of the transmitter 110 monitors the recommended MCSs and corresponding coherence time periods of the receiver 120. When one of the coherence time periods expires, the MCS manager 140 sends a message to the receiver 120 to request another recommendation of MCS and coherence time period.

The receiver 120 in FIG. 1 is depicted as comprising, for example, a MCS recommending module 150. As the receiver 120 receives data packets from the transmitter 110, the MCS recommending module 150 of the receiver 120 samples some or all of the received data packets, extracts the Channel State Information (CSI) from each of the sampled data packets, and determines a signal-to-noise ratio (SNR) for each MIMO spatial stream and OFDM subcarrier of the MIMO-OFDM communication channel at the time each of the sampled data packets was transmitted. The SNR values are used to form a SNR matrix, and the SNR matrix is converted to a bit-error rate (BER) matrix and eventually to an aggregate BER metric, eBER, for each MCS. The CSI and eBER represent the current conditions and properties of the communication channel over which the data packets were transmitted.

From the history of the previously observed eBERs of the communication channel, the MCS recommending module 150 determines a time period, called a "coherence time period," where the eBER of the communication channel does not vary more than a predetermined amount or remains within a predetermined range. The predetermined range may be determined by the user of the receiver 120 or set by the receiver 120. The predefined eBER range may be derived from a target Packet Error Rate (PER), which is typically defined as 10% for 1024 byte sized packets in 802.11-based communications. From the previously observed CSIs and their eBERs, an eBER table for each MCS is created and then updated each time an eBER is calculated. The eBER table is updated in a weighted averaging manner in which the eBERs from the recently observed CSIs within the coherence time may be given higher weights than the older ones. From the updated eBER table, the optimal MCS for the next packet transmission is recommended/selected. The optimal MCS is the MCS that yields the highest communication bit-rate while its eBER is at most a target eBER derived from a target Packet Error Rate (PER). The MCS recommending module 150 then transmits the selected MCS back to the transmitter 110 as a recommendation of modulation and coding scheme for the next data packet transmission.

Figure 2:
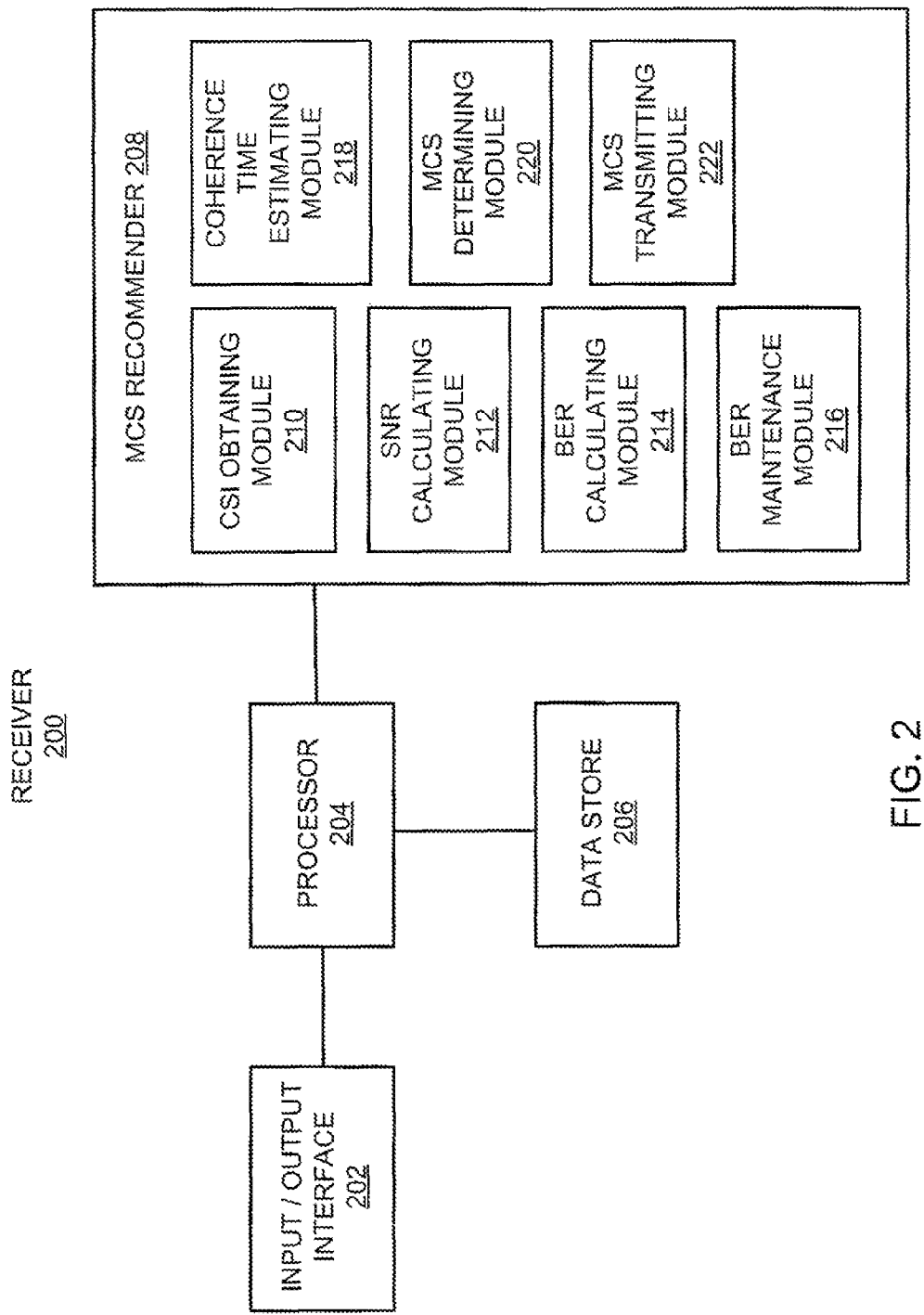
FIG. 2 shows a block diagram of a data packet receiver, according to an example of the present disclosure.

With reference now to FIG. 2, there is shown a block diagram of a receiver 200 for receiving data packets from a transmitter and recommending a MCS to the transmitter, according to an example of the present disclosure. The receiver 200 of FIG. 2 may comprise the receiver 120 depicted in FIG. 1. It should be understood that the receiver 200 may include additional components and that one or more of the components described herein may be removed and/or modified without departing from a scope of the receiver 200.

The receiver 200 is depicted in FIG. 2 as including an input/output interface 202, a processor 204, a data store 206, and a MCS recommender 208. The MCS recommender 208 performs the functions of the MCS recommending modules 150 depicted in FIG. 1. In particular, the MCS recommender 208 comprises, for instance, software and/or hardware that is to perform a method for sampling data packets received from a transmitter by the input/output interface 202 and generating a recommendation of a MCS to send back to the transmitter. The MCS recommender 208 is depicted as including a CSI obtaining module 210, a SNR calculating module 212, a BER calculating module 214, a BER maintenance module 216, a coherence time estimating module 218, a MCS determining module 220, and a MCS transmitting module 222.

The processor 204, which may comprise a microprocessor, a micro-controller, an application specific integrated circuit (ASIC), and the like, is to perform various processing functions in the receiver 200. One of the processing functions includes invoking or implementing the modules 210-222 contained in the MCS recommender 208 as discussed in greater detail herein below.

According to an example, the MCS recommender 208 comprises a hardware device, such as a circuit or multiple circuits arranged on a board. In this example, the modules 210-222 comprise circuit components or individual circuits. According to another example, the MCS recommender 208 comprises a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like. In this example, the modules 210-222 comprise software modules stored in the MCS recommender 208. According to a further example, the modules 210-222 comprise a combination of hardware and software modules.

The input/output interface 202 may comprise a hardware and/or software interface that enables wireless receipt and transmission of data packets. The processor 204 may store the data packets received through the input/output interface 202 in the data store 206 and may use the data packets in implementing the modules 210-222 of the MCS recommender 208. The data store 206 comprises volatile and/or non-volatile memory, such as DRAM, EEPROM, MRAM, phase change RAM (PCRAM), Memristor, flash memory, and the like. In addition, or alternatively, the data store 206 comprises a device that is to read from and write to a removable media, such as a floppy disk, a CD-ROM, a DVD-ROM, or other optical or magnetic media.

Figure 3A:
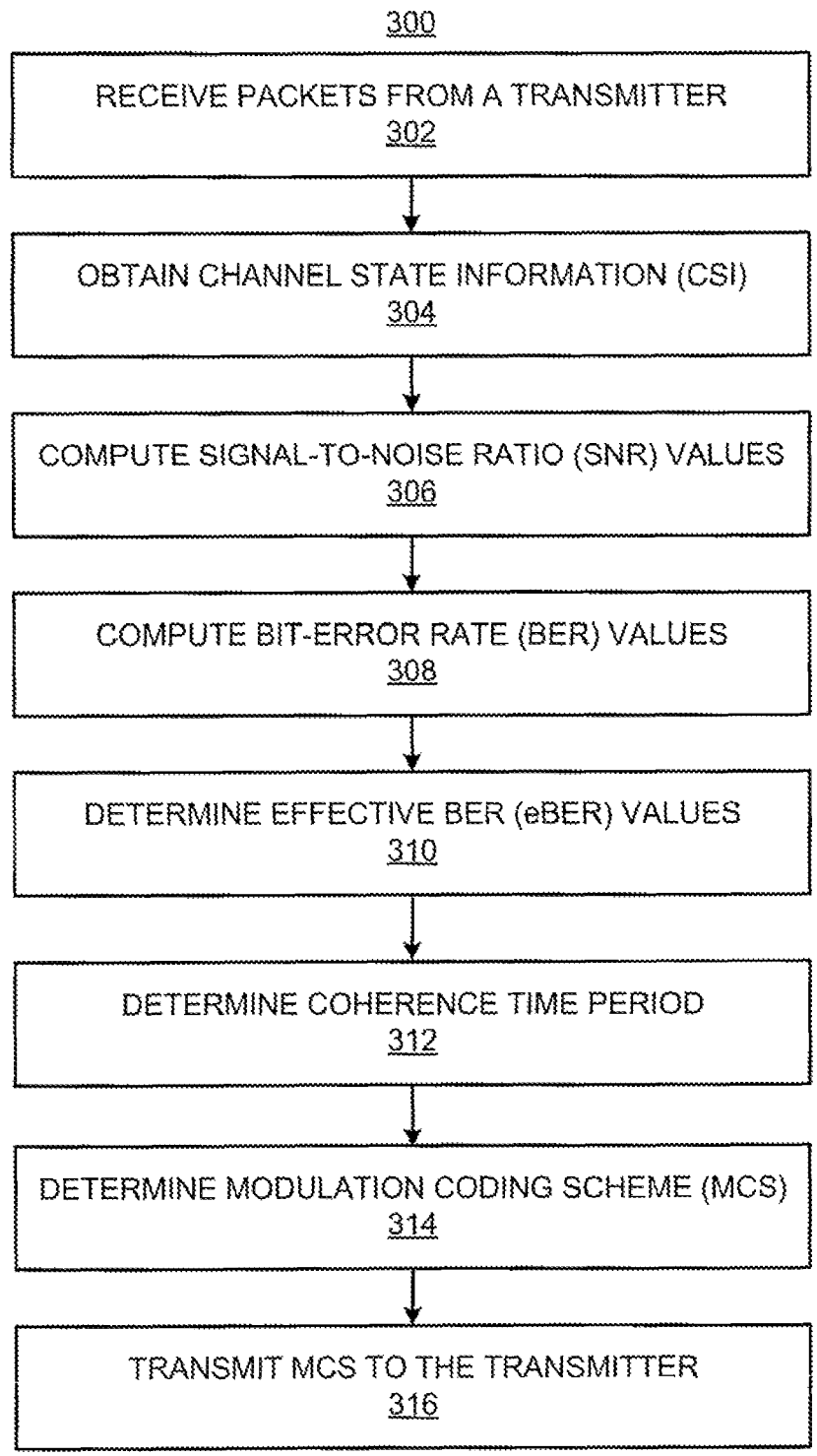
FIGS. 3A and 3B, respectively, depict flow diagrams of methods of recommending a MCS by the receiver, according to examples of the present disclosure.
Figure 3B:
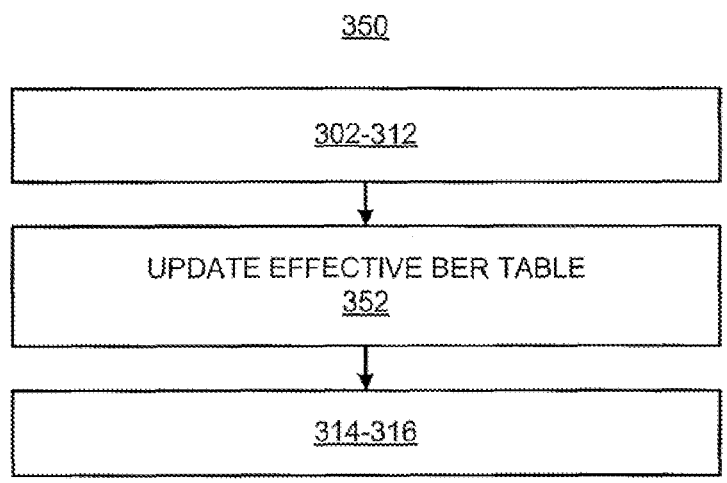

Various manners in which the modules 210-222 of the MCS recommender 208 may be implemented are discussed in greater detail with respect to the methods 300 and 350 respectively depicted in FIGS. 3A and 3B. Particularly, FIGS. 3A and 3B depict flow diagrams of methods 300 and 350 for selecting a MCS scheme to send to a transmitter, according to examples. It should be apparent to those of ordinary skill in the art that the methods 300 and 350 represent generalized illustrations and that other operations may be added or existing operations may be removed, modified, or rearranged without departing from the scopes of the methods 300 and 350. Although particular reference is made to the MCS recommender 208 depicted in FIG. 2 as comprising an apparatus and/or a set of machine readable instructions that may perform the operations described in the methods 300 and 350, it should be understood that differently configured apparatuses and/or machine readable instructions may perform the methods 300 and 350 without departing from the scopes of the methods 300 and 350.

With reference first to FIG. 3A, at block 302, data packets are received over a communication channel from a transmitter through, for instance, the input/output interface 202 of the receiver 200. The transmitter may comprise the transmitter 110 of FIG. 1. The communication channel may be the wireless communication channel 130 of FIG. 1. In addition, the input/output interface 202 may transfer the received data packets to the processor 204 for further procedures.

At block 304, channel state information (CSI) of the communication channel is obtained from the received packets, for instance, by the CSI obtaining module 210. In an example, the CSI obtaining module 210 receives all of the data packets received by the input/output interface 202. Alternatively, the CSI obtaining module 210 receives a sampling of data packets periodically and/or at different points in time. In any regard, the CSI obtaining module 210 extracts or reads the CSI from the received data packets through any suitable manner. For instance, in an IEEE 802.11n system, the CSI may be obtained by analyzing the preamble of the received data packets with training sequences in the preamble. The CSI values extracted from the received data packets are used to form a CSI matrix for all subcarriers (or sub-channels) and MIMO spatial streams in the communication channel.

Generally speaking, the CSI represents the current conditions and properties of the communication channel over which the data packets were transmitted. As such, at different points in time, the CSI obtaining module 210 obtains the CSI of the communication channel from the data packets that the receiver 200 receives from the transmitter 110.

At block 306, the signal-to-noise ratio (SNR) matrix of the communication channel is computed, for instance, by the SNR calculating module 212, based on the CSI matrix obtained at block 304. For instance, from each of the CSI values, the SNR calculating module 212 may utilize a conventional process to calculate the SNR values of the communication channel, such as the CSI-to-SNR conversion processes discussed in "Performance Analysis of Link Adaptation in LTE Systems" by Tao et al., International ITG Workshop on Smart Antennas (WSA) 2011, and "Predictable 802.11 Packet Delivery from Wireless Channel Measurements" by Halperin et al., ACM SIGCOMM Aug. 30-Sep. 3, 2010 (hereinafter "Halperin"), the disclosures of which are hereby incorporated by reference in their entireties. Generally speaking, each of the calculated SNR values represents the link quality of the communication channel at the time the respective data packet was transmitted. In the method 300 of FIG. 3A, the SNR calculating module 212 computes the SNR values of the communication channel from the CSI values that the CSI obtaining module 210 obtained at different points in time, and generates the SNR matrix from the computed SNR values.

At block 308, a bit-error rate (BER) matrix is computed based upon the SNR matrix calculated at block 306, for instance, by the BER calculating module 214. Particularly, the BER calculating module 214 converts the SNR values in the SNR matrix into corresponding BER values through implementation of conventional conversion methods, and generates the BER matrix.

At block 310, a plurality of effective BER (eBER) values are determined by, for instance, the BER maintenance module 216. Each of the eBER values represents an aggregate metric of the BER values in the BER matrix generated by the BER calculating module 214 at block 308, indicating the reliability of a packet transmission over the communication channel. Over time, a plurality of BER matrices are generated by the BER calculating module 214 and thus, a plurality of eBER values are determined by the BER maintenance module 216.

In an example, the communication channel between the transmitter (e.g., transmitter 110 of FIG. 1) and the receiver 200 (e.g., receiver 120 of FIG. 1) may be divided into a plurality of sub-channels or sub-carriers. According to an example, the communication channel comprises an OFDM-MIMO system channel and the plurality of sub-channels comprise sub-channels of the OFDM-MIMO system A plurality of data spatial streams are transmitted from the transmitter to the receiver 200 over the plurality of sub-channels. In this example, each effective BER value may be calculated using the BER values calculated at block 308 and the following equation:

$$eBER = \Sigma^{SS}_i \Sigma^{SC}_j BER(SNR_{i,j}),\qquad\text{Equation (1):}$$

where eBER represents the effective BER value, SS represents the total number of data spatial streams transmitted from the transmitter, SC represents the total number of sub-channels of the communication channel, and $BER(SNR)_{i,j}$ represents a BER value of $i^{th}$ data stream in $j^{th}$ sub-channel.

According to an example, a time-averaged eBER value for each transmitter and each MCS that the transmitter uses for packet transmission is determined, for instance, by the BER maintenance module 216 of the receiver 200. By way of example, if the transmitter-receiver communication channel supports a total of 12 different MCSs considering the MIMO spatial streams, the BER maintenance module 216 may calculate a total of 12 eBER values.

At block 312, a coherence time period is determined, for instance, by the coherence time estimating module 218, using the eBER values calculated at block 310. The coherence time period is defined as the time duration within which the eBER values of the communication channel remained within a predetermined range. In other words, the coherence time period is a time duration within which the quality or the state of the communication channel between the transmitter and the receiver 200 does not change significantly. From the eBER values calculated by the BER maintenance module 216 over a period of time, the coherence time estimating module 218 may determine a coherence time period during which the eBER values fluctuate or remain within a predetermined range. The predetermined range of acceptable eBER values may be set by the receiver 200 or by a user of the receiver 200 through a user interface. The predetermined eBER range may be derived from a target Packet Error Rate (PER), which is typically defined as 10% for 1024 byte sized packet in 802.11-based communications.

In addition, prior to determining the coherence time period, the CSI values obtained from the received data packets may be normalized using a CSI normalized correlation, and a standard deviation of the eBER values according to a time span may be computed. The CSI values may be normalized through implementation of conventional normalization methods. The SNR calculating module 212 may then utilize the normalized CSI values to calculate the SNR values of the communication channel. The BER calculating module 214 converts the SNR values into BER values, and the BER maintenance module 216 then computes the standard deviation of eBER values from the BER values. Subsequently, the coherence time estimating module 218 may determine a coherence time period within which the calculated eBER values remain within the predetermined range.

At block 314, a modulation and coding scheme (MCS) to be implemented by the transmitter is determined, for instance, by the MCS determining module 220, based upon the eBER values determined at block 310 and the coherence time period determined at block 312. Various manners in which the MCS is determined are discussed in greater detail below with respect to the method 350 in FIG. 3B. According to an example, the determined MCS comprises a substantially optimal MCS to be employed by a transmitter in transmitting data packets to the receiver. The MCS to be employed by a transmitter may be considered as being substantially optimal when the transmission of data packets is maximized subject to the link quality and signal strength of the link between the transmitter and the receiver. The optimal MCS is the one that yields the highest communication bit-rate (or throughput) while its eBER is below the target eBER derived from the target PER.

At block 316, the MCS determined at block 312, or a value associated with the determined MCS, is transmitted to the transmitter, for instance, by the MCS transmitting module 222. In addition, the coherence time period related to the determined MCS value is transmitted to the transmitter. The transmitter utilizes the determined MCS value as a recommendation to select a MCS to transmit data packets to the receiver within a period corresponding to the coherence time period. Alternatively, the receiver 200 may send several different MCS values in accordance with different packet lengths to the transmitter, so that the transmitter may select one of the MCS values for data transmission based on the length of each data packet. For example, if the packet length is smaller than 200 bytes, the transmitter may send the packet using MCS 20 of the IEEE 802.11n system. If the packet length is larger than 1 Kbytes, the transmitter may send the packet using MCS 16 that is lower, but more robust than MCS 20.

The MCS value that the receiver 200 sends to the transmitter is considered a MCS feedback message. The MCS feedback message may be transmitted in one of two ways: piggy backing or null data packet. In the piggy backing method, if there is backward traffic from the receiver 200 to the transmitter, the processor 204 of the receiver 200 may record the MCS value(s) selected by the MCS determining module 220 in a link adaptation field in the control header of a return packet. If there is no backward traffic, the receiver 200 may transmit a null data packet with the MCS value(s). The receiver 200 may want to send the null data packet with the MCS value(s) when there is no backward traffic to the transmitter in order to avoid a delay in transmitting the MCS values(s) because the delay is critical especially in a mobile scenario. It is possible to set an access category of the null data packet to AC_VO, which has the lowest delay and the highest probability to access the channel. In this way, the receiver 200 may reliably deliver the MCS feedback message to the transmitter.

Optionally, the receiver 200 may include the MCS value(s) in a field called "valid_duration". This information gives a hint to the transmitter until when the transmitter may regard the MCS feedback message as valid. The value is calculated as follows: valid_duration=Coherence_Time_From_Now−MCS Feedback Delay. This feature may be useful when the communication link between the transmitter and the receiver is highly asymmetric. Thus, the estimated MCS coherence time, independently calculated by the transmitter and the receiver, differ from each other.

When a data packet received by the receiver 200 is corrupt, the receiver 200 may not be able to identify the original transmitter of the data packet. In this case, the receiver 200 may infer the original transmitter by using: (1) similarity of a source address, and (2) similarity of the information in the Physical Layer Convergence Protocol (PLCP) header of the received data packet. Furthermore, when the received signal strength indicator (RSSI) has not changed, that may be an indication that the CSI and, thus, the resultant eBER value, might not have changed. In this case, the receiver 200 may reuse the previous MCS value to recommend the transmitter.

Turning now to FIG. 3B, the method 350 includes many of the same blocks as those depicted in the method 300 in FIG. 3A. As such, descriptions of the blocks that are the same in both the methods 300 and 350 are not repeated with respect to the method 350. As shown in FIG. 3B, at block 352, following blocks 302-312, an eBER table containing the effective BER values over a span of time is maintained, for instance, by the BER maintenance module 216. Generally speaking, the eBER table tracks the recent effective BER trend of the communication channel. In addition, the BER maintenance module 216 may store the eBER table in the data store 206. Moreover, the BER maintenance module 216 may assign a weight value to each eBER entry in the eBER table according to the coherence time period determined by the coherence time estimating module 218. Particularly, the eBER values that fall within the coherence time period may be assigned greater weight values than the eBER values that fall outside of the coherence time period. As such, recent eBER values that are within the coherence time period have a higher value than other eBER values. As discussed above, the coherence time period is a time duration within which the eBER values or quality of the communication channel remain within a predetermined range.

Furthermore, the eBER table may be updated after each time the BER maintenance module 216 calculates a new eBER value. The coherence time period may vary as the table is updated with the new eBER value. In an example, each eBER entry in the table is updated using the following equation:

$$eBER \text{ entry} = \alpha(t_1) \cdot eBER_0 \cdot (t_1 - t_0) + \alpha(t_2) \cdot eBER_1 \cdot (t_2 - t_1) + \alpha(t_3) \cdot eBER_2 \cdot (t_3 - t_2), \quad \text{Equation (2)}:$$

where $t_x$ is the time instance when the receiver has received the packet x, $eBER_x$ is the computed eBER from the packet x, and $\alpha(t)$ is an exponential function such that $$\alpha(t) = \beta \cdot e^{-\beta t}, \text{ where } \beta = 1/(\text{Coherence Time}). \quad \text{Equation (3)}:$$

As such, if the coherence time period is short, the exponential function $\alpha(t)$ decays more rapidly. As a result, the older eBER data may be ignored. The receiver 200 updates the eBER table such that the eBER metric shows the overall channel status during a certain time period, while still quickly reacting to the time varying channel.

Figure 4:
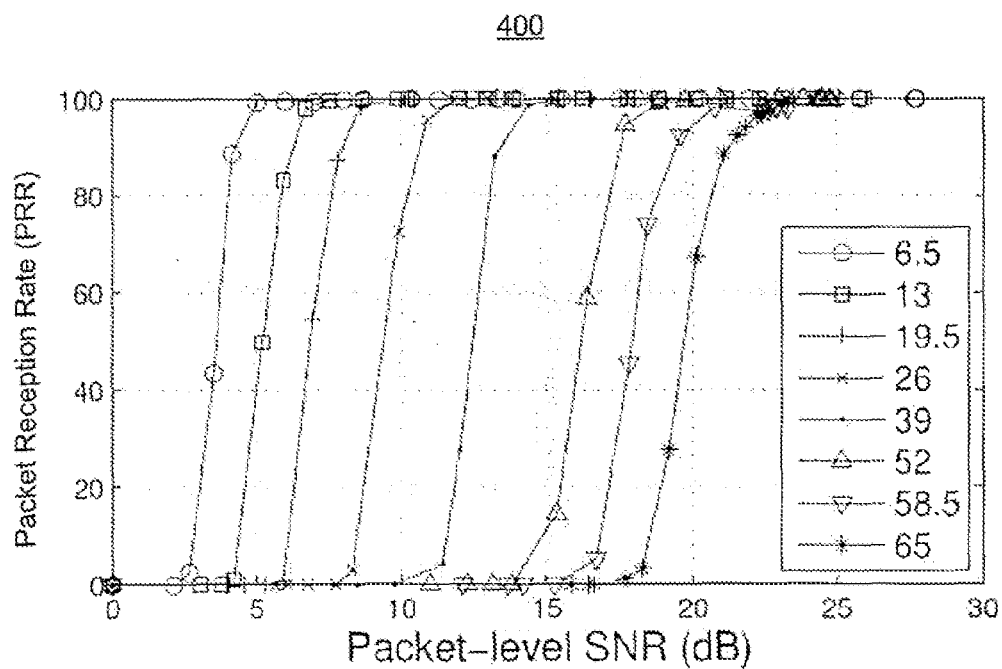
FIG. 4 depicts a signal-to-noise ratio (SNR) vs. packet reception rate (PRR) graph.

At block 314, the MCS to be implemented by the transmitter may be determined from the eBER entries in the table, for instance, by the MCS determining module 220. The MCS determining module 220 may determine the MCS by mapping each of the eBER entries within the coherence time period to specific MCS values, and selecting an optimal MCS value that would give a highest throughput for packet transmission. The receiver 200 may use a conventional SNR vs. Packet Reception Rate (PRR) curve, such as the SNR vs. PRR curve in FIG. 1(a) of Halperin reproduced herein as graph 400 in FIG. 4, to obtain a relationship between eBER values and MCS values, wherein the SNR values in FIG. 4 are equivalent to the eBER values. To select an optimal MCS value, the MCS determining module 220 may consider the length of the packets that the receiver 200 expects to receive from the transmitter because the optimal MCS may vary according to the packet length even when the eBER value stays the same.

Figure 5:
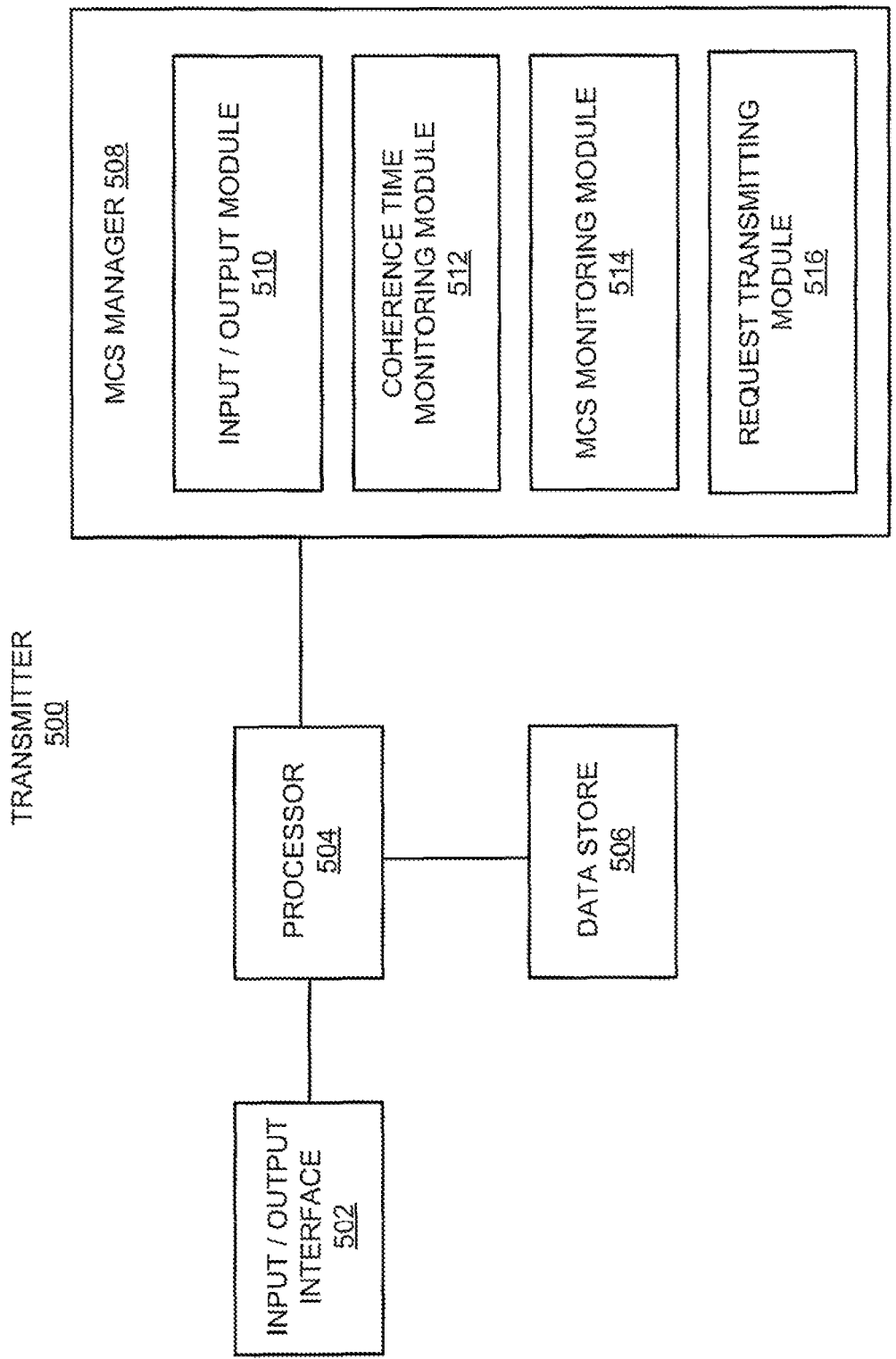
FIG. 5 shows a block diagram of a data packet transmitter, according to an example of the present disclosure.

With reference now to FIG. 5, there is shown a block diagram of a transmitter 500, according to an example of the present disclosure. It should be understood that the transmitter 500 may include additional components and that one or more of the components described herein may be removed and/or modified without departing from a scope of the transmitter 500.

According to an example, the transmitter 500 may be implemented in the access point 110 depicted in FIG. 1. The transmitter 500 is depicted as including an input/output interface 502, a processor 504, a data store 506, and a MCS manager 508. The MCS manager 508 comprises, for instance, software and/or hardware that is to perform the functions of the MCS manager 140 of the transmitter 110 depicted in FIG. 1, which is to manage the MCSs of the WLAN 100 and select one of the MCSs for transmitting data packets to the receiver 120.

The MCS manager 508 is depicted as including an input/output module 510, a coherence time monitoring module 512, a MCS monitoring module 514, and a request transmitting module 516. The processor 504, which may comprise a microprocessor, a micro-controller, an application specific integrated circuit (ASIC), and the like, is to perform various processing functions in the transmitter 500. One of the processing functions includes invoking or implementing the modules 510-516 contained in the MCS manager 508 as discussed in greater detail herein below.

According to an example, the MCS manager 508 comprises a hardware device, such as a circuit or multiple circuits arranged on a board. In this example, the modules 510-516 comprise circuit components or individual circuits. According to another example, the MCS manager 508 comprises a volatile or non-volatile memory, such as DRAM, EEPROM, MRAM, Memristor, flash memory, floppy disk, CD-ROM, DVD-ROM, or other optical or magnetic media, and the like. In this example, the modules 510-514 comprise software modules stored in the MCS manager 508. According to a further example, the modules 510-516 comprise a combination of hardware and software modules.

The input/output interface 502 may comprise a hardware and/or software interface that enables wireless receipt and transmission of data packets. The processor 504 may store data packets received through the input/output interface 502 in the data store 506 and may use the data packets in implementing the modules 510-516 of the MCS manager 508. The data store 506 comprises volatile and/or non-volatile memory, such as DRAM, EEPROM, MRAM, PCRAM, Memristor, flash memory, and the like. In addition, or alternatively, the data store 506 comprises a device that is to read from and write to a removable media, such as a floppy disk, a CD-ROM, a DVD-ROM, or other optical or magnetic media.

Figure 6:
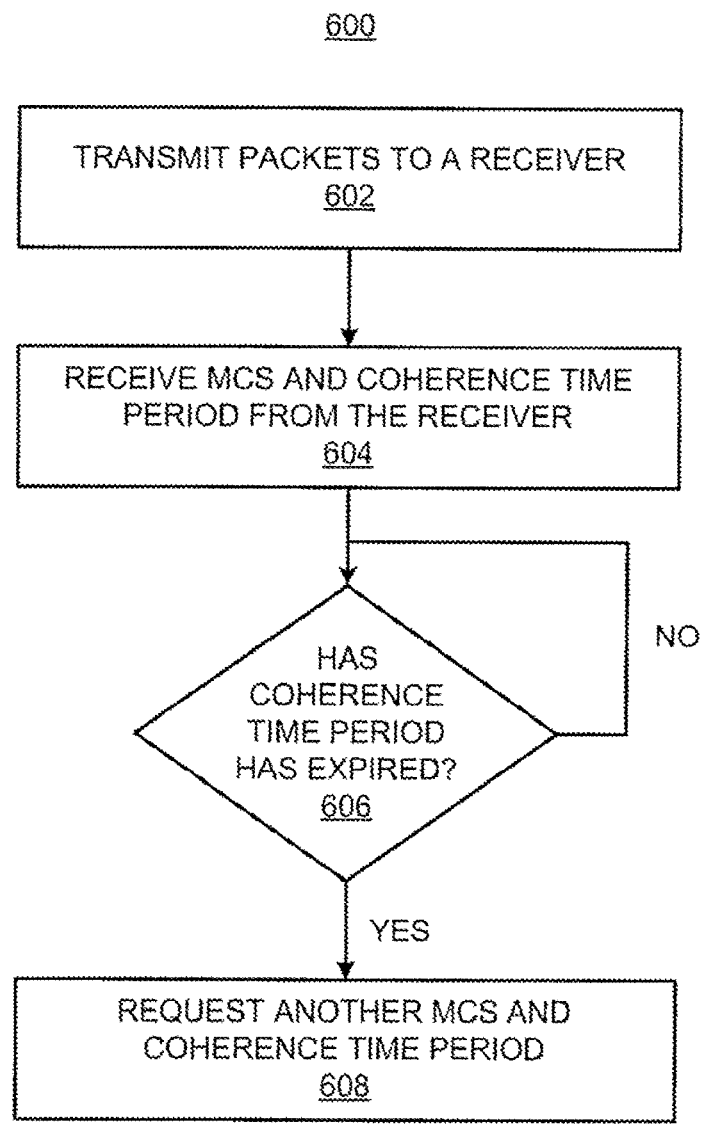
FIG. 6 depicts a flow diagram of a method of managing MCSs by the transmitter, according to an example of the present disclosure.

Various manners in which the modules 510-516 of the MCS manager 508 may be implemented are discussed in greater detail with respect to the method 600 depicted in FIG. 6. Particularly, FIG. 6 depicts a flow diagram of a method 600 of operating the transmitter 500, according to an example. It should be apparent to those of ordinary skill in the art that the method 600 represents a generalized illustration and that other operations may be added or existing operations may be removed, modified, or rearranged without departing from the scope of the method 600. Although particular reference is made to the MCS manager 508 depicted in FIG. 5 as comprising an apparatus and/or a set of machine readable instructions that may perform the operations described in the method 600, it should be understood that differently configured apparatuses and/or machine readable instructions may perform the method 600 without departing from the scope of the method 600.

With reference to FIG. 6, at block 602, data packets are transmitted to a receiver, for instance, the receiver 200 of FIG. 2, by the transmitting module 510. The transmitting module 510 may transmit the data packets via the input/output interface 502 using a MCS that was determined and communicated to the transmitter 500 as discussed above with respect to either of the methods 300 and 350 in FIGS. 3A and 3B.

At block 604, a feedback data packet is received from the receiver, for instance, the receiver 200 of FIG. 2, through the input/output interface 502. The feedback data packet includes a MCS value (or values) recommended by the receiver 200. The feedback data packet also includes a coherence time period corresponding to the recommended MCS value. The MCS monitoring module 514 stores and tracks the most recently recommended MCS values from the receiver 200. The processor 504 utilizes the recommended MCS value to transmit data packets to the receiver 200 during the coherence time period. In an example, if the feedback data packet from the receiver contains a plurality of recommended MCS values and corresponding lengths of packets, the processor 504 of the transmitter 500 may select one of the recommended MCS values based on the length of each packet to be transmitted to the receiver 200.

At block 606, a determination as to whether the coherence time period has expired is made, for instance, by the MCS monitoring module 512. If the coherence time period has not expired, which corresponds to the "no" condition, the processor 504 continues to utilize the recommended MCS value for data transmission to the receiver 200. However, if the coherence time period has expired, at block 608, a MCS request message is transmitted to the receiver 200, for instance, by request transmitting module 516. The MCS request message is sent to the receiver 200 via the input/output interface 502 to request another MCS value and another corresponding coherence time period. In addition, the request transmitting module 516 may also issue a MCS request message to the receiver 200 periodically, even when the coherence time period has not expired. That is because the MCS feedback information may become stale after a certain amount of time in a time-varying communication channel. In addition, the request transmitting module 516 may also issue a MCS request message to the receiver 200 when a packet transmission has failed with the recommended MCS.

Some or all of the operations set forth in the methods 300, 350, and 600 may be contained as a utility, program, or subprogram, in any desired computer accessible medium. In addition, the methods 300, 350, and 600 may be embodied by computer programs, which may exist in a variety of forms both active and inactive. For example, they may exist as machine readable instructions, including source code, object code, executable code or other formats. Any of the above may be embodied on a non-transitory computer readable storage medium. Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 7:
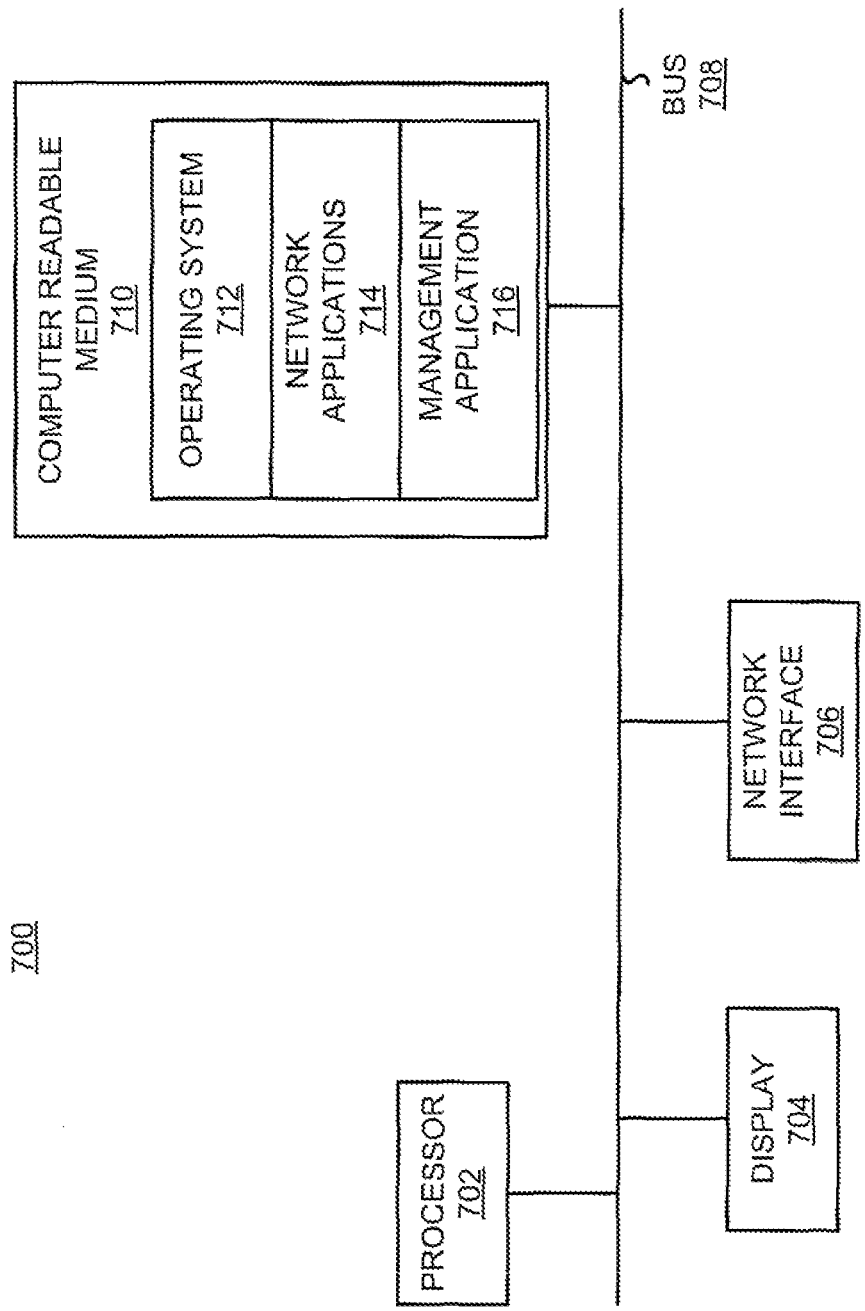
FIG. 7 illustrates a schematic representation of a computing device, which may be employed to perform various functions of the receiver depicted in FIG. 2 or the transmitter depicted in FIG. 5, according to an example of the present disclosure.

Turning now to FIG. 7, there is shown a schematic representation of a computing device 700, which may be employed to perform various functions of the MCS recommender 208 depicted in FIG. 2 or the MCS manager 508 depicted in FIG. 5, according to an example. The computing device 700 includes a processor 702, such as but not limited to a central processing unit; a display device 704, such as but not limited to a monitor; a network interface 706, such as but not limited to a Local Area Network LAN, a wireless 802.11x LAN, a 3G mobile WAN or a WiMax WAN; and a computer-readable medium 710. Each of these components is operatively coupled to a bus 708. For example, the bus 708 may be an EISA, a PCI, a USB, a FireWire, a NuBus, or a PDS.

The computer readable medium 710 comprises any suitable medium that participates in providing instructions to the processor 702 for execution. For example, the computer readable medium 710 may be non-volatile media, such as memory. The computer-readable medium 710 may also store an operating system 712, such as but not limited to Mac OS, MS Windows, Unix, or Linux; network applications 714; and a management application 716. The operating system 712 may be multi-user, multiprocessing, multitasking, multithreading, real-time and the like. The operating system 712 may also perform basic tasks such as but not limited to recognizing input from input devices, such as but not limited to a keyboard or a keypad; sending output to the display 704; keeping track of files and directories on medium 710; controlling peripheral devices, such as but not limited to disk drives, printers, image capture device; and managing traffic on the bus 708. The network applications 714 include various components for establishing and maintaining network connections, such as but not limited to machine readable instructions for implementing communication protocols including TCP/IP, HTTP, Ethernet, USB, and FireWire.

The management application 716 provides various components for selecting a MCS to send to a transmitter as discussed above with respect to the method 200 depicted in FIG. 2. The management application 716 may thus comprise the modules of the MCS recommender 208 depicted in FIG. 2, including the CSI obtaining module 210, the SNR calculating module 212, the BER calculating module 214, the BER maintenance module 216, the coherence time estimating module 218, the MCS determining module 220, and the MCS transmitting module 222. In another example, the management application 716 provides various components for monitoring the MCS in a transmitter as discussed above with respect to the method 600 depicted in FIG. 6. The management application 716 may thus comprise the modules of the MCS manager 508 depicted in FIG. 5, including the input/output module 510, the coherence time monitoring module 512, the MCS monitoring module 514, and the request transmitting module 516.

In certain examples, some or all of the processes performed by the management application 716 may be integrated into the operating system 712. In certain examples, the processes may be at least partially implemented in digital electronic circuitry, or in computer hardware, machine readable instructions (including firmware and software), or in any combination thereof, as also discussed above.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. A method comprising:
  receiving packets transmitted over a communication channel from a transmitter;
  obtaining channel state information (CSI) of the communication channel from the received packets, wherein the CSI indicates conditions of the communication channel;
  computing signal-to-noise ratio (SNR) values of the communication channel based on the obtained CSI;
  determining effective bit error rate (BER) values of the communication channel based on the SNR values;
  determining a coherence time period, wherein the coherence time period is a time duration within which the effective BER values of the communication channel remain within a predetermined range:
  determining a modulation and coding scheme (MCS) to be implemented by the transmitter based on the effective BER values within the coherence time period; and
  transmitting the determined MCS to the transmitter.

2. The method of claim 1, wherein obtaining the CSI of he communication channel from the received packets further comprises:
  sampling the received packets at different points in time; and
  obtaining the CSI from the sampled packets, wherein the obtained CSI indicates the conditions of the communication channel at the different points in time.

3. The method of claim 2, wherein computing the SNR values of the communication channel further comprises computing the SNR values of the communication channel based on the CSI obtained from the sampled packets.

4. The method of claim , wherein the communication channel is divided into a plurality of sub-channels, wherein the communication channel comprises an orthogonal frequency-division multiplexing multiple-input-multiple-output (OFDM-MIMO) system channel and the plurality of sub-channels comprise sub-channels of the OFDM-MIMO system, and wherein determining the effective BER values further comprises:
  calculating the SNR values of a plurality of data streams in the plurality of sub-channels of the communication channel;
  calculating a plurality of bit error rate (BER) values based upon the calculated SNR values: and determining one of the effective BER values based on the plurality of BER values.

5. The method of claim 4, wherein determining one of the effective BER values further comprises determining one of the effective BER values by using the following equation:

$$eBER = \epsilon^{SS}_i \epsilon^{SC}_j BER(SNR_{ij}),$$

wherein eBER represents an effective BER value, SS represents a total number of data streams, SC represents a total number of sub-channels of the communication channel, and $BER(SNR_{ij})$ represents a BER value of the $i^{th}$ data stream in the $j^{th}$ sub-channel.

6. The method of claim 1, further comprising:
maintaining a table that tracks the effective BER values of the communication channel with respect to time;
updating the table when a new effective BER value is determined; and
providing weight values to the effective BER values in the table, wherein the weight values of the effective BER values within the coherence time period are greater than the weight values of the effective BER values outside of the coherence time period.

7. The method of claim 6, wherein determining the MCS further comprises:
determining a plurality of MCS values based on the effective BER values within the coherence time period; and
selecting one of the plurality of MCS values that provides a highest throughput to transmit to the transmitter.

8. The method of claim 1, wherein determining the MCS further comprises determining the MCS based on a length of a packet expected to be transmitted by the transmitter.

9. A receiver comprising:
at least one module to
receive packets transmitted over a communication channel from a transmitter:
obtain channel state information (CSI) from the received packets, wherein the CSI indicates conditions of the communication channel;
compute signal-to-noise ratio (SNR) values of the communication channel based on the obtained CSI;
determine effective bit error rate (BER) values of the communication channel based on the SNR values;
determine a coherence time period, wherein the coherence time period is a time duration within which the effective BER values of the communication channel remain within a predetermined range:
determine a modulation and coding scheme (MCS) to be mplemented by the transmitter based on the effective BER values within the coherence time period; and
transmit the determined MCS to the transmitter; and
a processor to implement the at least one module.

10. The receiver of claim 9, wherein the at least one module is further to sample the received packets at different points in time: and
obtain the CSI from the sampled packets, wherein the obtained CSI indicates the conditions of the communication channel at the different points in time, to obtain the CSI of the communication channel from the received packets.

11. The receiver of claim 9, wherein the communication channel is divided into a plurality of sub-channels, wherein the communication channel comprises an orthogonal frequency-division multiplexing multiple-input-multiple-output (OFDM-MIMO) system channel and the plurality of sub-channels comprise sub-channels of the OFDM-MIMO system and the plurality of sub-channels comprise sub-channels of the OFDM system, and wherein the at least one module is further to:
calculate the SNR values of a plurality of data streams in the plurality of sub-channels of the communication channel;
calculate a plurality of bit error rate (BER) values based upon the calculated SNR values; and
determine one of he effective BER values based on the plurality of BER values.

12. The receiver of claim 9, wherein the at least one module is further to:
maintain a table that tracks the effective BER values of the communication channel with respect to time;
update the table when a new effective BER value is determined; and
provide weight values to the effective BER values in the table, wherein the weight values of the effective BER values within the coherence time period are greater than the weight values of the effective BER values outside of the coherence time period.

13. A method of operating a transmitter, comprising:
receiving, from a receiver, a message including a modulation coding scheme (MCS) to send packets to the receiver over a communication channel and a coherence time period to send the packets, wherein the coherence time period is a time duration within which signal-to-noise ratio (SNR) values of the communication channel remain within a predetermined range;
determining whether the coherence time period has expired; and
if the coherence time period has expired, transmitting a request to the receiver to request another MCS and another coherence time period.

14. The method of claim 13, further comprising:
periodically transmitting a request to the receiver to reques nother MCS.

15. The method of claim 13, wherein the message received from the receiver includes a plurality of MCSs, the method further comprising:
selecting one of the plurality of MCSs to transmit packets to the receiver based on a length of each of the packets.

* * * * *